(12) United States Patent
Nicholson et al.

(10) Patent No.: US 12,330,884 B2
(45) Date of Patent: *Jun. 17, 2025

(54) AUTOMATED WORKPIECE INVERSION SYSTEMS AND RELATED METHODS

(71) Applicant: ATS CORPORATION, Cambridge (CA)

(72) Inventors: Kenneth Wayne Nicholson, Cambridge (CA); Philip David Munroe, Cambridge (CA); James Mark McLean, Cambridge (CA); Robert James MacGregor, Cambridge (CA); David Andrew Tait, Cambridge (CA); Gustavo Barea, Cambridge (CA); Roger Craig Hogan, Cambridge (CA)

(73) Assignee: ATS CORPORATION, Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,933

(22) Filed: Mar. 18, 2024

(65) Prior Publication Data

US 2024/0308783 A1 Sep. 19, 2024

Related U.S. Application Data

(63) Continuation of application No. 17/697,627, filed on Mar. 17, 2022, now Pat. No. 11,932,497.

(60) Provisional application No. 63/168,158, filed on Mar. 30, 2021.

(51) Int. Cl.
*B65G 47/248* (2006.01)
*B65G 47/90* (2006.01)

(52) U.S. Cl.
CPC ......... *B65G 47/248* (2013.01); *B65G 47/902* (2013.01); *B65G 47/905* (2013.01); *B65G 2203/0283* (2013.01)

(58) Field of Classification Search
None
See application file for complete search history.

(56) References Cited

U.S. PATENT DOCUMENTS

| 5,440,943 A * | 8/1995 | Holt | G01R 31/2887 414/626 |
|---|---|---|---|
| 6,782,991 B2 * | 8/2004 | Johansson | B65G 47/252 198/377.07 |
| 7,845,483 B2 * | 12/2010 | Noguchi | B23P 21/004 198/346.3 |

(Continued)

*Primary Examiner* — William R Harp

(57) ABSTRACT

A method of inverting workpieces in a mass production process includes: advancing an end effector in electronic synchronization with advancement of a carrier to synchronize arrival of the carrier at a stop position with arrival of the end effector at an unloading position, in which the end effector is in alignment with a workpiece held by the carrier for engaging the workpiece; while the end effector is in engagement with the workpiece, retracting the end effector away from the carrier to unload the workpiece from the carrier and advancing the end effector back toward the carrier to load the workpiece back into the carrier; and rotating the end effector relative to the carrier to invert the workpiece in electronic synchronization with the retracting and advancing of the end effector for loading the workpiece back into the carrier when inverted.

20 Claims, 10 Drawing Sheets

(56) References Cited

U.S. PATENT DOCUMENTS

| | | | |
|---|---|---|---|
| 9,904,281 B2 * | 2/2018 | Nicholson | G05B 19/18 |
| 10,018,985 B2 * | 7/2018 | Nicholson | G05B 19/19 |
| 11,932,497 B2 * | 3/2024 | Nicholson | B25J 15/0052 |

* cited by examiner

AUTOMATED WORKPIECE INVERSION SYSTEMS AND RELATED METHODS

CROSS-REFERENCE TO RELATED APPLICATIONS

This application is a continuation of U.S. patent application Ser. No. 17/697,627, filed Mar. 17, 2022, which claims the benefit of U.S. Provisional Patent Application No. 63/168,158, filed Mar. 30, 2021. The entire contents of U.S. patent application Ser. No. 17/697,627 and U.S. Provisional Patent Application No. 63/168,158 is hereby incorporated by reference for all purposes.

FIELD

The present disclosure relates to systems and methods for inverting workpieces in an automated mass production process.

BACKGROUND

U.S. Pat. No. 9,904,281 (Nicholson et al.) discloses an automated method of assembling or processing components using computer numerical controlled drives to decouple the stages of delivering components to a tool, into a series of separately programmable stages, namely, a component loading stage, a component separating stage, an accelerating stage, and a delivery stage, wherein the timing, position, speed, velocity, and acceleration of each component during each stage is selected through programming of the computer numerical controls.

U.S. Pat. No. 10,018,985 (Nicholson et al.) discloses a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

SUMMARY

The following summary is intended to introduce the reader to various aspects of the applicant's teaching, but not to define any invention.

According to some aspects, a method of inverting workpieces in an automated mass production process includes: (a) advancing a carrier along a transport track toward a stop position adjacent a workpiece inversion station, the carrier holding at least one workpiece; (b) advancing an end effector of the workpiece inversion station to an unloading position in electronic synchronization with advancement of the carrier to the stop position to synchronize arrival of the carrier at the stop position with arrival of the end effector at the unloading position, in which the end effector is in alignment with the workpiece held by the carrier at the stop position for engaging the workpiece; (c) while the end effector is in engagement with the workpiece, retracting the end effector from the unloading position to unload the workpiece from the carrier and advancing the end effector to a loading position to load the workpiece back into the carrier; and (d) during (c), rotating the end effector relative to the carrier by 180 degrees to invert the workpiece in electronic synchronization with the retracting and advancing in (c) for loading the workpiece back into the carrier when inverted.

In some examples, the loading position is spaced apart from the unloading position.

In some examples, the rotating in (d) is initiated during retraction of the end effector away from the carrier and terminates during advancement of the end effector back toward the carrier.

In some examples, movement of the end effector from the unloading position to the loading position in (c) comprises a generally continuous, uninterrupted translation of the end effector.

In some examples, the rotating in (d) comprises a generally continuous, uninterrupted rotation of the end effector.

In some examples, the method further includes: (e), after the workpiece is loaded into the carrier, operating the end effector to release the workpiece, and retracting the end effector away from the loading position in electronic synchronization with advancement of the carrier along the track away from the stop position.

In some examples, the method includes: (f), after (e), rotating the end effector by 180 degrees relative to the carrier to reset a rotational orientation of the end effector in preparation for a subsequent inversion cycle.

In some examples, the method includes repeating (a) to (f) for a plurality of subsequent carriers.

In some examples, during (c), the workpiece is unloaded from a first location on the carrier and loaded back on the carrier at a second location on the carrier spaced apart from the first location.

In some examples, the first location comprises a first nest for holding the workpiece prior to inversion, and the second location comprises a second nest for holding the workpiece when inverted.

In some examples, the workpiece defines a first product part, and the carrier has a second product part at the second location, the second product part loaded into the carrier prior to the carrier arriving at the stop position, and wherein (c) includes mating the first product part with the second product part during loading of the workpiece back into the carrier.

In some examples, the second location is at an elevation below the first location and spaced horizontally apart from the first location toward the inversion station when the carrier is at the stop position.

According to some aspects, a method of inverting workpieces in an automated mass production process includes: (a) advancing at least one carrier along a transport track toward a stop position adjacent a workpiece inversion station, the at least one carrier holding a plurality of workpieces; (b) advancing a plurality of end effectors of the workpiece inversion station to an unloading position in electronic synchronization with advancement of the at least one carrier to the stop position to synchronize arrival of the at least one carrier at the stop position with arrival of the end effectors at the unloading position, in which each end effector is in alignment with a corresponding workpiece held by the at least one carrier at the stop position for engaging the workpieces; (c) while the end effectors are in engagement with corresponding workpieces, retracting the end effectors away from the unloading position to unload the workpieces from the at least one carrier and advancing the end effectors to a loading position to load the workpieces back into the at least one carrier; and (d) during (c), rotating each end effector relative to the at least one carrier by 180 degrees to invert the workpieces in electronic synchronization with movement of the end effectors in (c) from the unloading position to the loading position for loading the workpieces back into the at least one carrier when inverted.

In some examples, the method further includes: (e), after the workpieces are loaded back into the at least one carrier, operating the end effectors to release the workpieces simultaneously, and retracting the end effectors away from the at least one carrier in electronic synchronization with advancement of the at least one carrier away from the stop position. In some examples, the at least one carrier comprises a plurality of the carriers, and each carrier holds a plurality of the workpieces.

According to some aspects, an automated mass production system, comprising: (a) a track including a plurality of carriers, each carrier holding at least one workpiece and advanceable through a stop position along the track; (b) a workpiece inversion station adjacent the stop position, the workpiece inversion station including a pick-and-place robot having at least one end effector, the end effector operable to engage the workpiece on a carrier at the stop position and translatable toward and away from the carrier for unloading the workpiece from the carrier and loading the workpiece back on the carrier, and the end effector rotatable relative to the carrier for inverting the workpiece when unloaded by the end effector; and (c) a control system for synchronizing operation of the carriers and inversion station, the control system configured to: (i) advance the end effector to an unloading position in electronic synchronization with advancement of the carrier to the stop position to synchronize arrival of the carrier at the stop position with arrival of the end effector at the unloading position, in which the end effector is in alignment with the workpiece held by the carrier at the stop position for engaging the workpiece; (ii) while the end effector is in engagement with the workpiece, retract the end effector away from the unloading position to unload the workpiece from the carrier and advance the end effector to a loading position to load the workpiece back into the carrier; and (iii) during (ii), rotate the end effector relative to the carrier by 180 degrees to invert the workpiece in electronic synchronization with movement of the end effector from the unloading position to the loading position for loading the workpiece back into the carrier when inverted.

In some examples, the control system is configured to initiate rotation of the end effector in (iii) during retraction of the end effector away from the carrier, and terminate rotation of the end effector in (iii) during advancement of the end effector toward the carrier.

In some examples, the retraction and advancement of the end effector in (ii) comprises a generally continuous, uninterrupted movement of the end effector.

In some examples, the control system is further configured to (iv), after (ii), retract the end effector away from the carrier in electronic synchronization with advancement of the carrier along the track away from the stop position.

In some examples, each carrier includes a first nest for holding the workpiece prior to inversion, and a second nest for holding the workpiece when inverted and spaced apart from the first nest, and wherein the unloading position is in alignment with the first nest for unloading the workpiece from the first nest, and the loading position is in alignment with the second nest for loading the workpiece when inverted into the second nest.

BRIEF DESCRIPTION OF THE DRAWINGS

The drawings included herewith are for illustrating various examples of apparatuses, systems, and processes of the present specification and are not intended to limit the scope of what is taught in any way. In the drawings.

DETAILED DESCRIPTION

Figure 1:
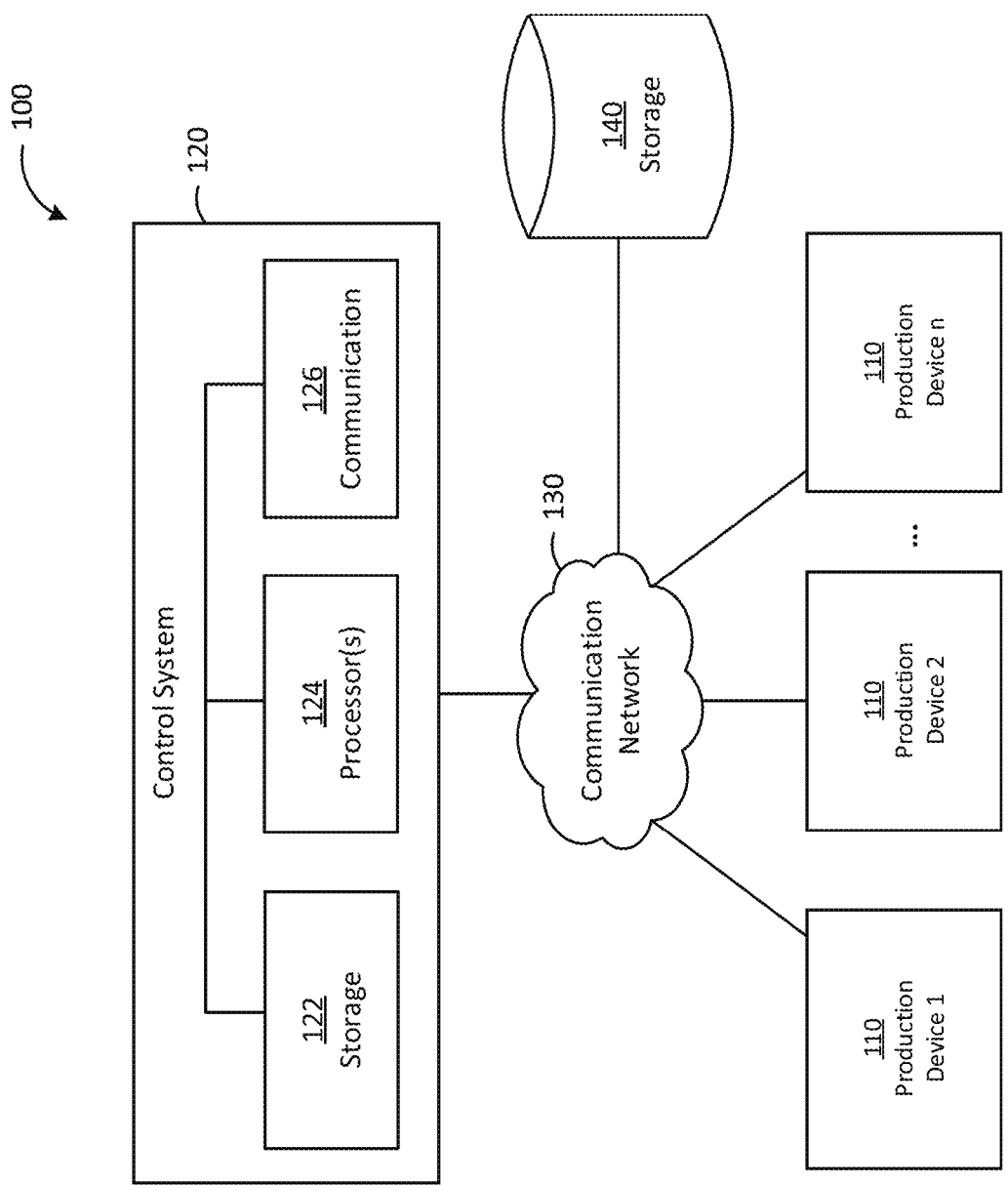
FIG. 1 is a schematic of an example automated mass production system.

Various apparatuses, systems, or processes will be described below to provide an example of an embodiment of each claimed invention. No embodiment described below limits any claimed invention and any claimed invention may cover apparatuses, processes, or systems that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. feeding, indexing, transferring, assembling, transporting, validating, etc.) parts to produce a product. During the production process, the part requiring further processing (for example, a subcomponent, assembly, or partially finished product) can be referred to as a workpiece. The workpiece can be moved through a production system among various production devices that operate on the workpiece(s) in production of the product.

In some applications, a production process may require inversion of workpieces for subsequent processing. According to some aspects of the present disclosure, a workpiece inversion system can include a plurality of production devices electronically synchronized to improve efficiency of workpiece inversion and/or repositioning. The production devices can include one or more presentation devices (e.g. carriers) and one or more processing devices (e.g. pick-and-place robots) operable in electronic synchronization with one another to facilitate a workpiece inversion process. In some examples, the workpiece inversion system can include a transport track having a plurality of carriers advanceable along the track through a stop position and a workpiece inversion station adjacent the stop position. The workpiece inversion station can include a pick-and-place robot having at least one end effector. The end effector can be operable to engage (e.g. grip) a workpiece held by the carrier at the stop position and translate toward and away from the carrier for unloading the workpiece from the carrier and loading the workpiece back into the carrier. The end effector can be rotatable relative to the carrier for inverting the workpiece when unloaded by the end effector. According to some aspects of the present disclosure, operation of the carrier and the pick-and-place robot components can be electronically synchronized for improved processing efficiency relative to some other systems.

Referring to FIG. 1, a schematic of an example automated production system 100 is shown. In the example illustrated, the production system 100 includes a plurality of production devices 110 for processing workpieces, a production control system 120 for controlling operation of the production devices 110 and/or other system components to facilitate a mass production process, a communication network 130 for enabling communication among system components, and a production system storage component 140 for storing relevant data for the production system 100 (e.g. operational and/or control data relating to the production devices 110 and/or other aspects of the system 100).

In the example illustrated, the control system 120 includes a control system storage component 122, one or more system processors 124, and a system communication component 126. The system processor 124 controls operation of the control system 120. In some examples, the system processor 124 and processors at the production devices 110 cooperate to control operation of the system 100 (e.g. through determination and/or processing of control parameters and generation of control signals for operation and synchronization based on the control parameters).

In some examples, the storage component 122 (e.g. memory) can store data received from the production devices 110, data for coordinating operation of the production devices 110, property data in respect of each production device 110, etc. The storage component 122 can store computer programs executable by the system processor 124 to facilitate communication among and operation of the system components.

The production system storage component 140 can be accessible via the communication network 130 and provided in addition to or in lieu of the control system storage component 122. In some examples, the control system storage component 122 can store current operating data corresponding to current operation of the control system 120 (e.g. current position, speed, velocity, and/or acceleration of production tooling), and the production system storage component 140 can store data for future use. In some examples, the storage component 140 can include third party data storage. The storage component 140 can store information about the production devices 110, including operating data, profile data (e.g., servo-motor profile data), motion data (e.g., tool motion data), part/workpiece/product data, etc. Such data can be stored in the storage component 140 for subsequent retrieval by the production devices 110 and/or control system 120, for example, through download via communication network 130.

The communication network 130 can carry data to enable communication among system components (e.g. among the control system 120, production devices 110, storage component 140, and/or other devices/components), and can be a wired and/or wireless communication network. In some examples, components of the system 100 (including, for example production devices 110 and control system 120) can include wireless communication interfaces to enable wireless communication through communication network 130.

Figure 2:
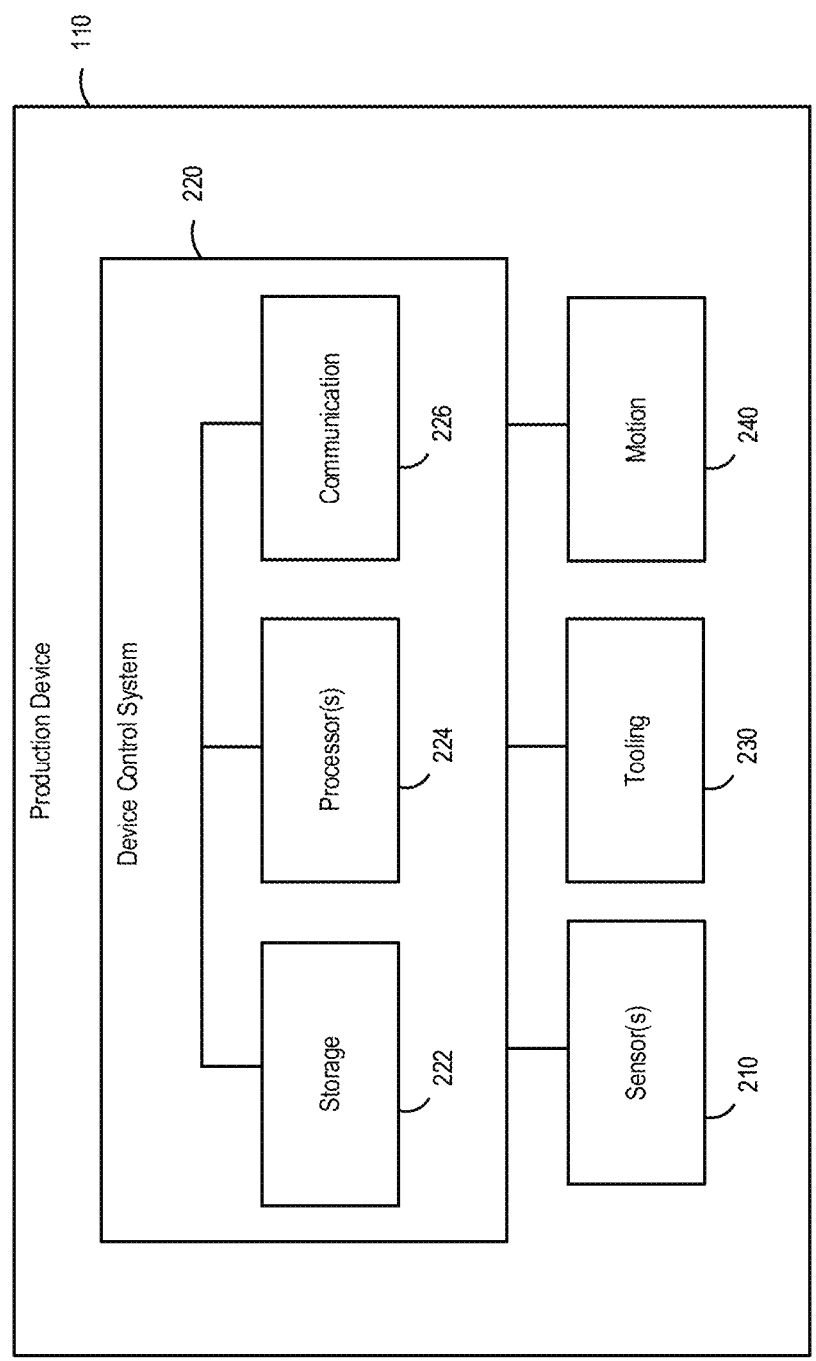
FIG. 2 is a schematic of an example production device of the system of FIG. 1.

Referring to FIG. 2, a block diagram representing an example production device 110 is shown. In the example illustrated, the production device 110 includes a device control system 220, a sensor system 210, tooling 230, and a motion system 240.

In the example illustrated, the device control system 220 includes a device processor 224, a device storage component (e.g. memory) 222, and a device communication component 226. The device control system 220 is operable to control operation of the production device 110, and can collect and store sensor, tooling, and motion data for the production device 110 in the device storage component 222 for operational use and/or for providing to the control system 120 through network 130 to facilitate electronic synchronization of production devices 110.

The device storage component 222 can store data for operation of the production device 110 and/or to facilitate electronic synchronization. Example data can include, for example, operating data, part data, tool data, motion data, sensor data, etc. The sensor system 210 can include one or more sensors (e.g. range-finding, motion, vision systems, etc.) for collecting operational and/or environmental data for facilitating the production process. Each production device 110 can be equipped with a motion system 240 for movement of the production device 110 and/or components thereof (e.g. sensors, tooling, etc.). The motion system 240 can include, for example, one or more servo-motors and/or other actuators.

The production devices 110 can be equipped with tooling 230 for engaging with and processing workpieces. Tooling 230 can be used for, for example, part handling, manipulation, transport, etc. The operation of tooling 230 can be controlled by the device control system 220 based on, for example, sensor data from the sensor system 210 and operational data for the production device 110 or other production devices 110 and/or system components.

The tooling 230 can be in the form of, for example, one or more workpiece presentation tools for presenting the workpieces at predetermined locations for delivery and/or further processing and/or one or more workpiece processing tools for performing value-added operations on the workpieces. The workpiece presentation tools can be part of, for example, one or more tracks, carriers, conveyors, screws, indexer, actuators, or other devices for, for example, separating workpieces from other workpieces and delivery of the workpieces to a processing tool for subsequent processing. In some examples, the presentation tools can be part of a carrier and configured to, for example, receive one or more workpieces, accelerate the workpieces toward a stop position (e.g. along a transport track) for a processing station, and present the workpieces at the processing position for processing by one or more processing tools of the station.

Processing tools can be configured to conduct one or more value-added operations on or with the workpieces. For example, the processing tools can be configured to manipulate a workpiece, assemble two or more workpieces together, reorient and/or reposition a workpiece for further processing, etc. In some examples, processing tools can include, e.g. end effectors such as manipulators and/or grippers for part manipulation, assembly, reorientation, etc. In some examples, the processing tools can be part of a pick-and-place robot and can be configured to, for example, unload one or more workpieces from a workpiece presentation tool (e.g. of a carrier); reorient (e.g. invert) the workpiece when unloaded; and load the workpiece when reoriented back into the workpiece presentation tool for subsequent processing.

Machine-readable instructions stored in storage component 222 (or in storage 122, 140) can cause the control system 220 (and/or 120) to execute various methods disclosed herein including generation of one or more signals (e.g., output data) useful in operation of the production devices 110. Such machine-readable instructions can be incorporated into one or more computer program products which can be stored on suitable medium or media. In some embodiments, the machine-readable instructions can be executable by processor 224 and/or 124 for generation of signals useful in electronic synchronization of two or more operations carried out by the tooling 230 (e.g. by presentation and processing tools) of the production devices 110. The machine-readable instructions can be executable by the processor(s) for determination and/or selection of control parameters for operation of the tooling 230 and generate signals representative of the control parameters. For example, the machine-readable instructions can be configured to cause processor 224 and/or 124 to generate signals useful in the electronic synchronization of, for example, the delivery of workpieces by a presentation tool and receipt of the workpieces by a processing tool; the processing steps performed by one or more processing tools; and/or delivery of a workpiece by the processing tool and receipt of the workpieces by the presentation tool.

The synchronization of two or more operations performed by the tooling 230 of one or more production devices 110 can utilize electronic camming (e.g. instead of mechanical cams, gears, or linkages). In various embodiments, the use of such electronic synchronization can facilitate system flexibility and improve system performance relative to some more-conventional systems utilizing mechanical synchronization means. In some examples, storage component 222 (and/or 122, 140) can hold data representative of one or more cam profiles to be used in the operation of the tooling 230 of one or more production devices 110. For example, such cam profile(s) can be in tabular form and can include corresponding positions representative of synchronized trajectories to be followed by the tooling 230 during operation. In some examples, one tooling component 230 can be operated as a master device and another tooling component 230 can be operated as a slave device executing movements based on the execution of movements by the master device in order to substantially maintain synchronization between the slave device and the master device. In some examples, the production devices 110 can include one or more master devices and one or more respective slave devices. For example, multiple slave devices can be electronically cammed with a master device.

The machine-readable instructions can be configured to cause processor 224 and/or 124 to generate signals useful in electronic synchronization (e.g. camming) of the delivery of a workpiece by a presentation tool and of receipt of the workpiece by a processing tool (or another presentation tool). In some embodiments, the machine-readable instructions can be configured to cause the processor(s) to generate signals useful in electronic synchronization of loading, separation, acceleration, and delivery of a workpiece by a presentation tool and of receipt of the workpiece by a processing tool. In some embodiments, the machine-readable instructions can be configured to cause the processor(s) to generate signals useful in controlling movement of a workpiece along a delivery trajectory and controlling movement of a processing tool along a processing tool trajectory for electronic synchronization of the workpiece and processing tool.

In some examples, the machine-readable instructions can be configured to cause processor 224 and/or 124 to generate signals useful in controlling at least some aspect of the processing of a workpiece. For example, such processing can include one or more value-added operations that can be carried out by the processing tool. Such value-added operation can include, for example, inversion and/or repositioning of workpieces on a carrier. The machine-readable instructions may, for example, be configured to cause processor 224 (and/or 124) to generate signals useful in electronic synchronization of the processing of a workpiece and one or more operations associated with presentation and/or processing tools. In some embodiments, the machine-readable instructions can be configured to cause the processor(s) to generate signals useful in controlling translation of a processing tool and rotation of the processing tool for electronic synchronization of the translation and rotation. In some examples, one or more operations conducted by the presentation or processing tools can be under binary control rather than direct electronic synchronization. In some examples, the triggering of an operation via a binary control signal can be dependent on the position of a master device and can still be based on a cam profile. The production devices 110 can include one or more servo-motors associated with tooling components 230, and the machine-readable instructions can be configured to cause processor 224 and/or 124 to generate signals useful in controlling the servo-motors according to a predetermined cam profile to carry out electronically synchronized operations according to the methods herein.

The production devices 110 can include a numerically synchronized control architecture. For example, transfer and presentation of workpieces (e.g. by presentation tools) according to the methods disclosed herein can include a first computer numerically controlled operation and the receiving of the workpiece (e.g. by a processing tool or another presentation tool) can include a second computer numerically controlled operation. In some examples, the loading, separating, accelerating, and delivering of workpieces can include a first computer numerically controlled operation and the receiving of the workpieces can include a second computer numerically controlled operation. In some examples, the receiving of a workpiece can include a first computer numerically controlled operation and the processing of the workpiece can include a second computer numerically controlled operation. In some examples, the processing of a workpiece can include a first computer numerically controlled operation and the delivery of the workpiece can include a second computer numerically controlled operation. In some examples, the translation of a workpiece can include a first computer numerically controlled operation and the rotation of the workpiece can include a second computer numerically controlled operation. In such examples, the first computer numerically controlled operation and the second computer numerically controlled operation can be electronically synchronized (e.g. electronically cammed).

Figure 3:
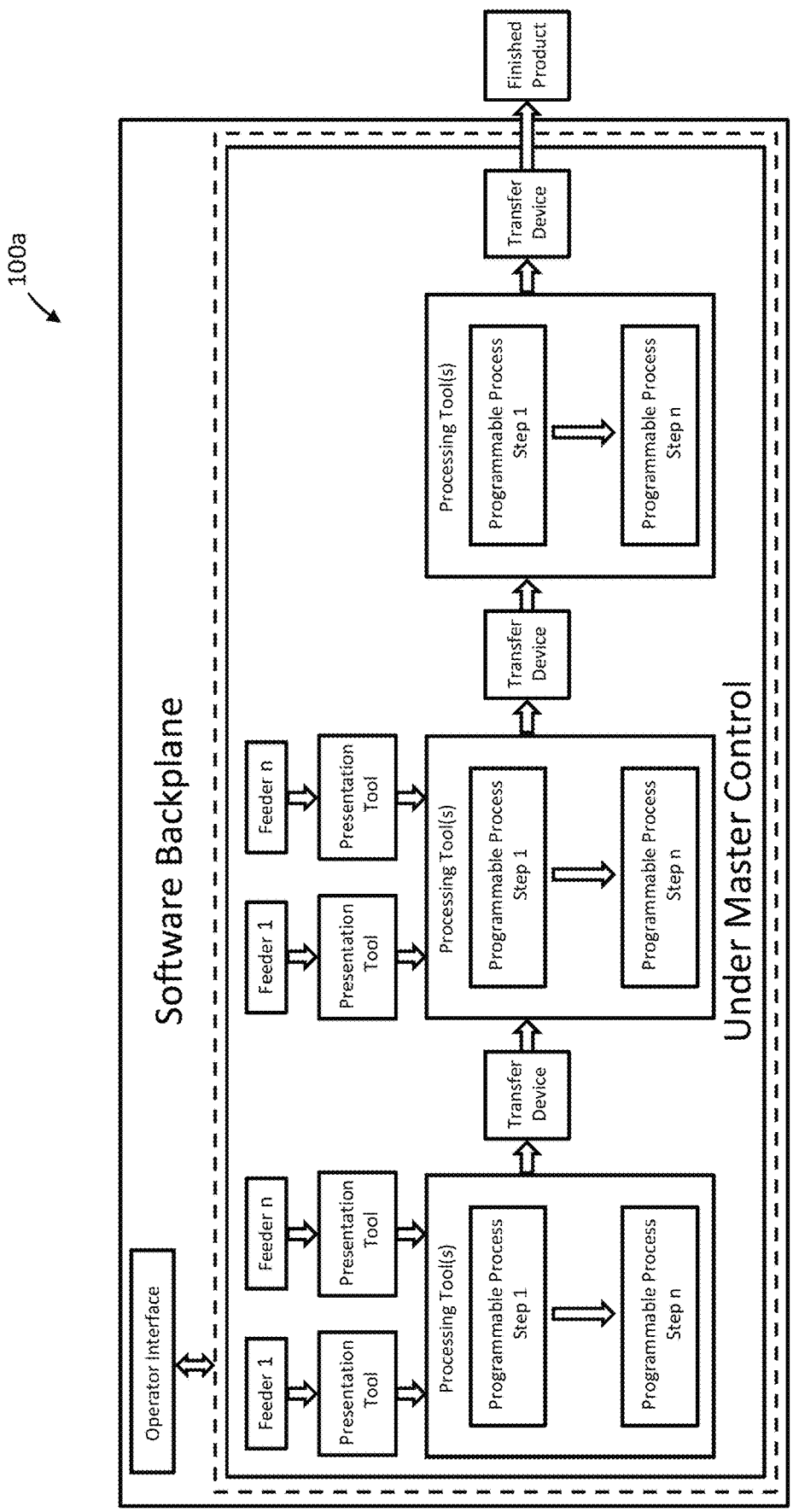
FIG. 3 is a schematic of an example implementation of the system 100 of FIG. 1.

Referring to FIG. 3, an example implementation 100a of the system 100 is shown schematically. The example system 100a can be configured to carry out steps from processes disclosed herein. System 100a can receive workpieces and/or raw materials as inputs; progressively add value to them via processing tools; and discharge them either as discrete finished products, as unfinished products, or as rejected scrap (i.e., defective products).

As shown in FIG. 3, system 100a can receive the workpieces and/or materials from one or more feeders (e.g. of a feed device) for delivering workpieces and/or materials to another presentation tool (e.g. of an indexing device). The delivery from the feeders can be done directly or via a respective buffer. Each presentation tool or transfer device (e.g. carrier) of the system 100a can be numerically controlled and configured to deliver the materials and/or workpieces to one or more processing tools (e.g. of a processing device). Each processing tool can add value to a workpiece and/or material via one or more programmable process steps. A given processing tool can operate in parallel to and/or in series with one or more other processing tools and/or presentation tools. Once the workpiece passes through a final processing tool, it can be discharged either as a successfully completed and validated finished product, as an unfinished product, or as rejected scrap. Human interaction with system 100a can be through an operator interface.

The system can include validation stations including validation devices configured to conduct inspections, checks, and/or tests on one or more of the workpieces. In some examples, the validation stations can be located at, for example, one or more feeders, presentation tools, transfer devices, and/or processing tools. At these points, workpieces can be eliminated from the system as scrap if they do not meet one or more predetermined inspection criteria. Validation stations can be configured to conduct inspection, check, and/or test operations on one or more of workpieces that can be electronically synchronized with other devices, such as, for example, a master device of the production devices 110.

The various elements described above can be controlled at least in part by software resources known as base software backplane. The backplane can be configured to permit various elements of the system to carry out various control functions including: management of inputs and outputs; management of local control tasks, including programmable process steps within processing tools and local inspection tasks within validation stations; communications between different elements in the system and communication with a human user via the operator interface.

The system 100a can include a numerically synchronized control architecture. In various embodiments, the feeders, presentation tools, processing tools, and transfer devices can be numerically controlled. Movement of workpieces and materials through the system can occur along programmable axes of motion, which can be either rotary or linear. Movement of tooling associated with the programmable process steps of processing tools can also take place along programmable linear and/or rotary axes of motion.

Figure 4:
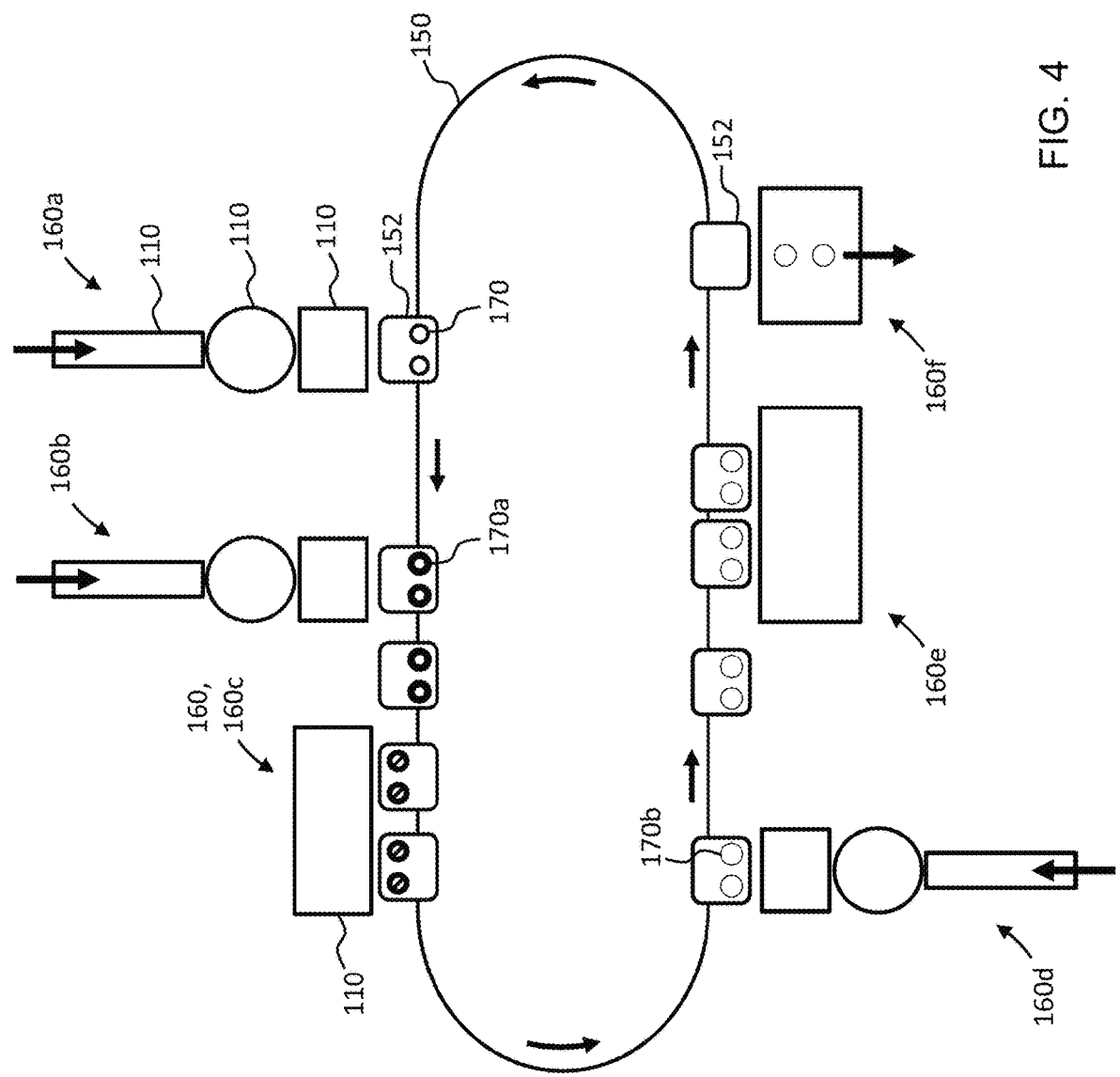
FIG. 4 is a schematic showing an example arrangement of a plurality of processing stations of the system of FIG. 1.

Referring to FIG. 4, an example arrangement of production devices 110 of the system 100 is shown schematically. In the illustrated example, the system 100 includes a transport track 150 supporting a plurality of carriers 152. Each carrier 152 comprises a pallet configured for holding at least one workpiece, and is movable along the track 150 (e.g. through one or more servo-drives) among a plurality of processing stations 160. Each processing station 160 includes one or more production devices 110 operable in electronic synchronization with each other, the carriers 152, and/or production devices 110 of other processing stations 160 for processing the workpieces.

In the example illustrated, the processing stations 160 shown in FIG. 4 include a first processing station 160a for transferring one or more workpieces 170 to each carrier 152 and a second processing station 160b for delivering and installing one or more parts (e.g. O-rings) onto the workpieces 170 held by the carrier 152 to form a workpiece assembly 170a. The processing stations 160 of the system 100 shown in FIG. 4 further include a third processing station 160c for reorienting (e.g. inverting) the workpiece assembly 170a held by the carrier 152, and optionally repositioning the reoriented workpiece assembly 170a on the carrier 152 and/or assembling the reoriented workpiece assembly with another product part held by the carrier 152. In the example illustrated, the processing stations 160 further include a fourth processing station 160d for delivering and installing one or more additional product parts onto the reoriented/repositioned workpiece assembly 170a held by the carrier to form a second workpiece assembly 170b, a fifth processing station 160e for validating, testing, and/or inspecting (and/or performing some other operation) on the second workpiece assembly 170b held by the carrier 152, and a sixth processing station 160f for removing the second workpiece assemblies 170b from the carrier for discharge from the system 100, either as a successfully completed and validated finished product, as an unfinished product, or as a rejected defective product.

Figure 5:
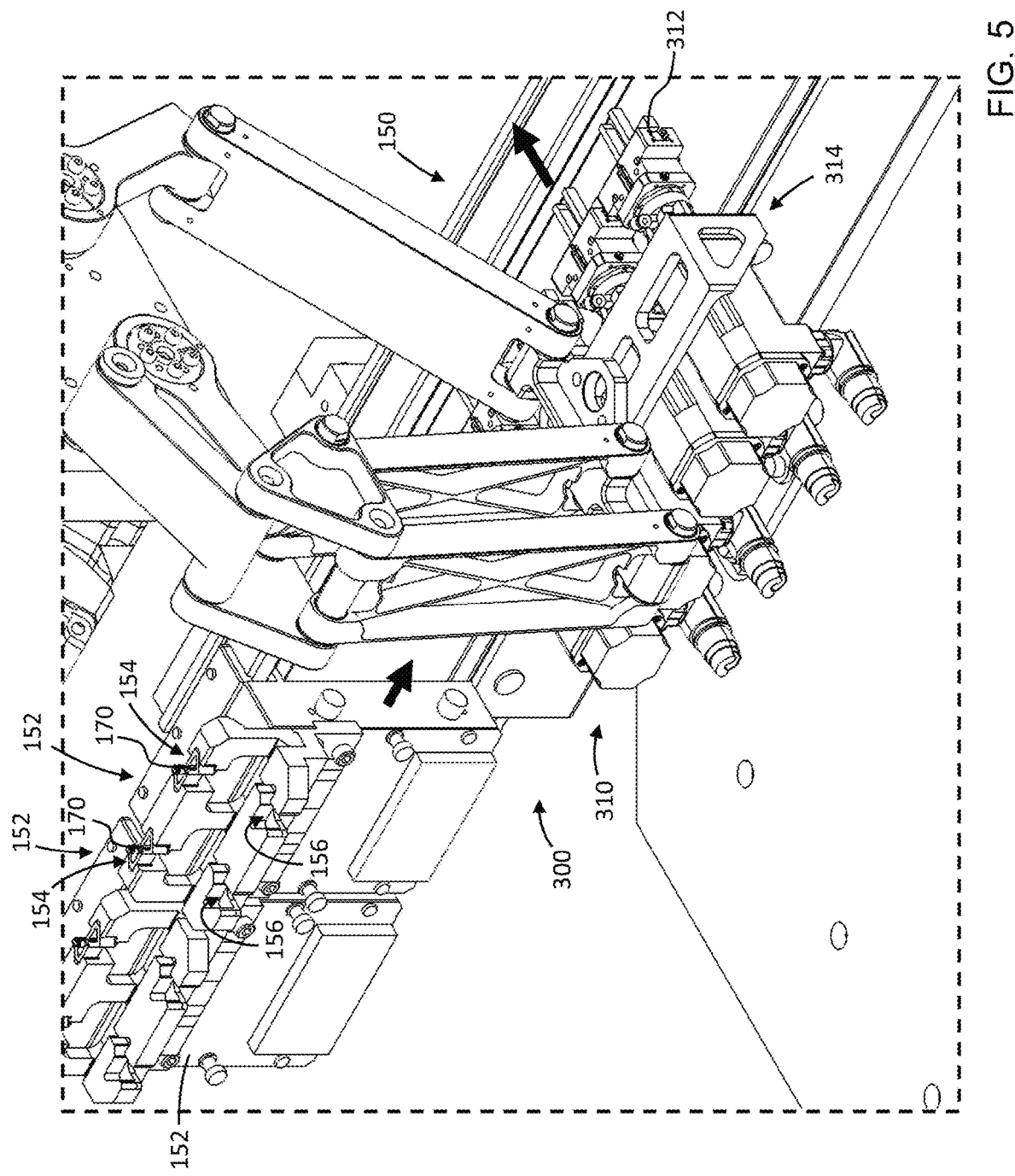
FIG. 5 is a perspective view of an example processing station of FIG. 4.

Referring to FIG. 5, an example workpiece inversion station 300 (e.g. for use as the third processing station 160c in the system 100 shown in FIG. 4) is illustrated. In the example illustrated, each carrier 152 holds at least one workpiece 170 (e.g. in the form of workpiece assembly 170a) and is advanceable through a stop position along the track 150 (only a portion of which is shown in FIG. 5) adjacent the workpiece inversion station 300. In the example illustrated, the station 300 includes a pick-and-place robot 310 for unloading one or more of the workpieces 170 from one or more carriers 152 at the stop position, inverting the unloaded workpieces 170, and loading the workpieces 170 when inverted back into the one or more carriers 152 at the stop position.

The pick-and-place robot 310 includes at least one end effector 312 operable to engage (e.g. grip) the workpiece 170 on the carrier 152 at the stop position. In the example illustrated, the end effector 312 is translatable toward and away from the carrier 152 at the stop position for unloading the workpiece from the carrier 152 and loading the workpiece 170 back into the carrier 152. The end effector 312 is rotatable relative to the carrier 152 for inverting the workpiece 170 when unloaded (and held) by the end effector 312.

In the example illustrated, each carrier 152 holds a plurality of the workpieces (e.g. two in the example illustrated), and a plurality of the carriers 152 (e.g. two in the example illustrated) are positionable at the stop position. In the example illustrated, the robot 310 is configured for unloading, inverting, and reloading the workpieces 170 held by each carrier 152 at the stop position (e.g. two workpieces from each carrier for a total of four workpieces in the example illustrated) simultaneously from the carriers 152 at the stop position. In the example illustrated, the robot 310 includes a plurality of the end effectors 312 (four in the example illustrated) operable simultaneously to engage (e.g. grip) and invert the workpieces 170 held by the carriers 152 at the stop position.

The end effectors 312 are moveable among an unloading position (shown in FIG. 6) adjacent the carriers 152 at the stop position for unloading the workpieces 170, one or more retracted positions (shown in, for example, FIGS. 5, 7, 9, and 10) clear of a work envelope of the carriers 152 (e.g. to permit advancement of the carriers 152 toward and away from the stop position and rotation of the end effectors 312 while holding the workpieces 170), and a loading position (shown in FIG. 8) adjacent the carriers 152 at the stop position for loading the workpieces 170 back into the carriers 152.

In some examples, the workpiece 170 can be unloaded from and loaded back into the same location on the carrier 152 (e.g. a nest for holding the workpiece in both uninverted and inverted positions). In such examples, the loading and unloading positions for the end effectors 312 can comprise a common position or adjacent positions in alignment with the location on the carrier 152 for unloading and loading the workpieces 170.

Figure 6:
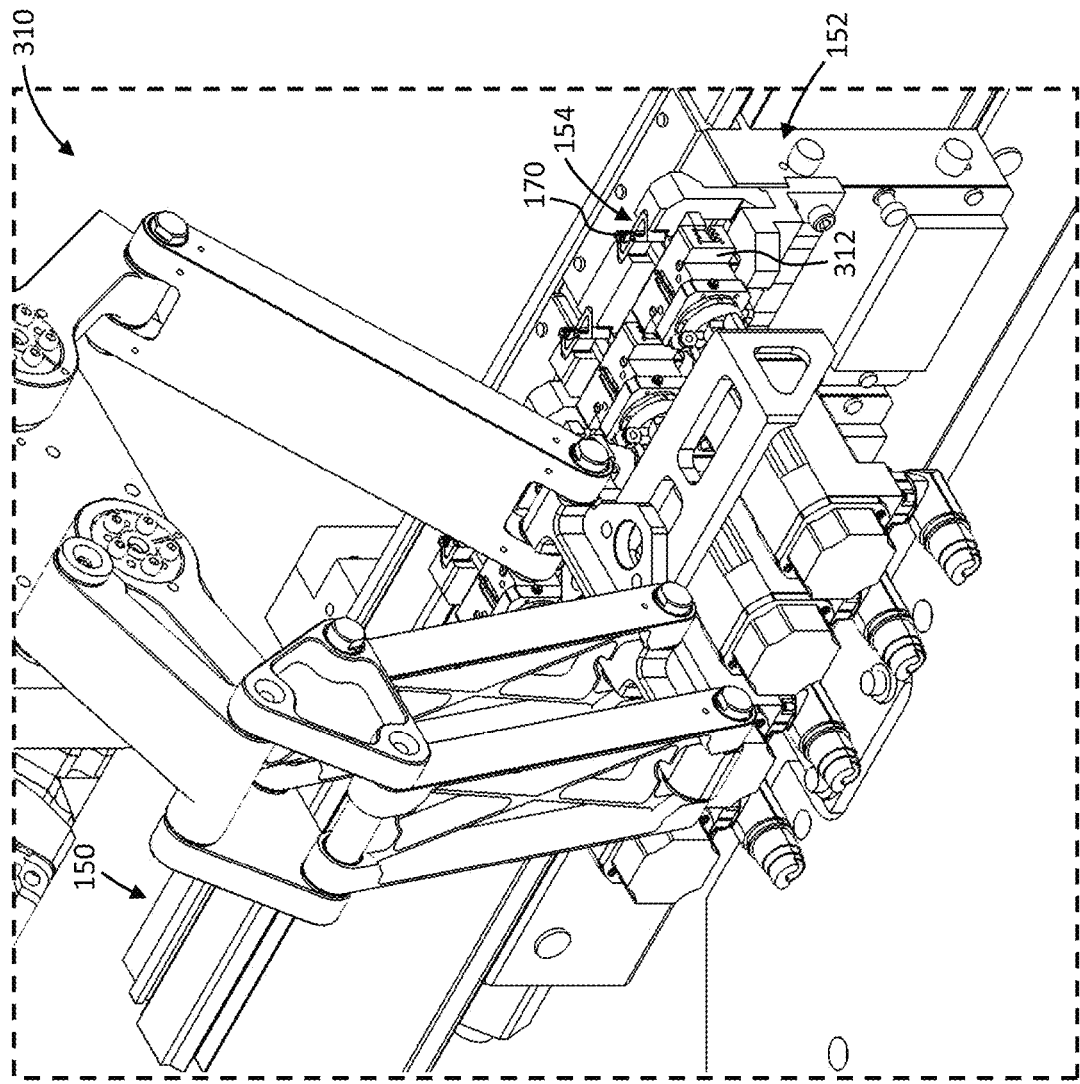
FIGS. 6 to 10 are perspective views like that of FIG. 5, showing example process steps for inverting workpieces using the station of FIG. 4.
Figure 8:
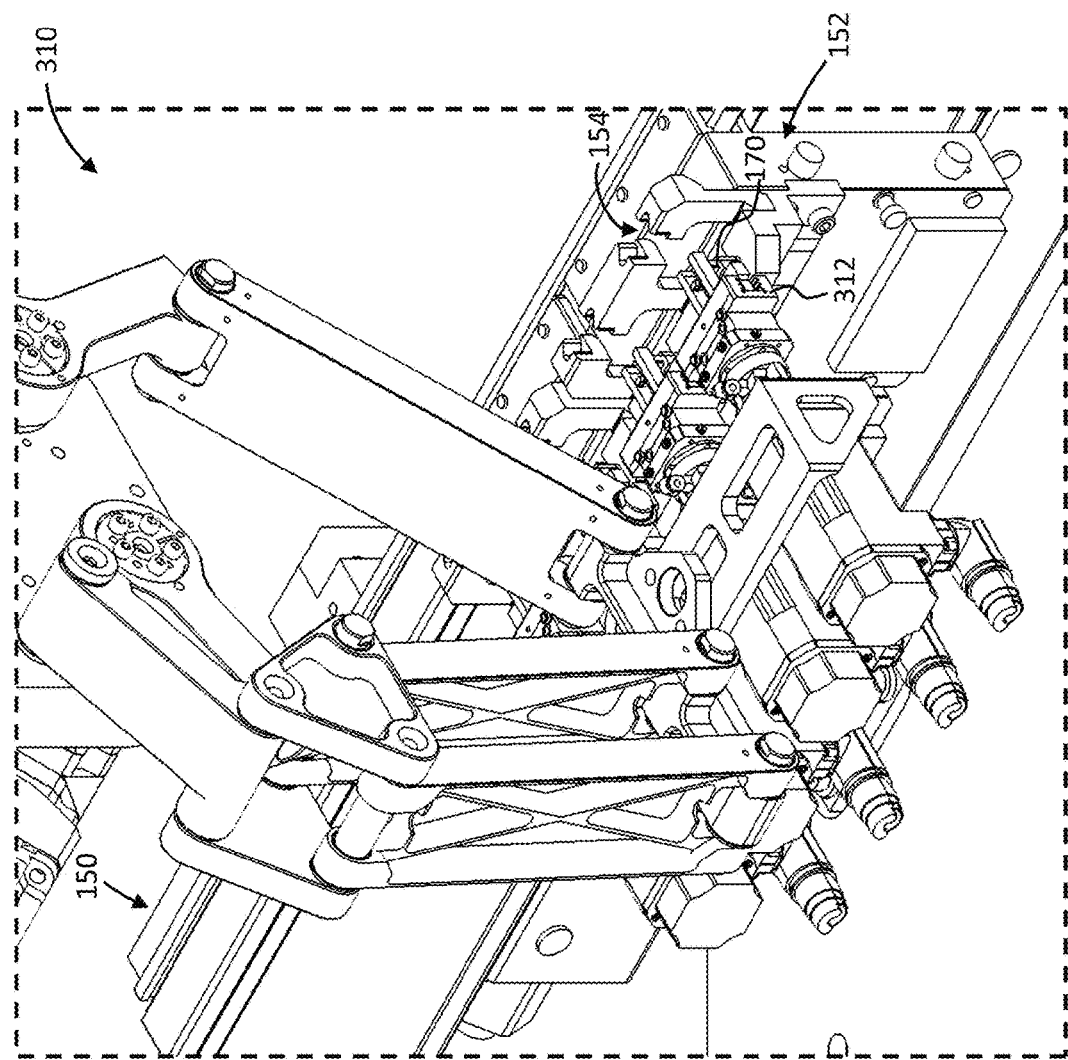

In the example illustrated, each carrier 152 includes a plurality of first locations 154 for holding the workpieces 170 prior to inversion and from which the workpieces 170 are unloaded, and a plurality of second locations 156 for holding the workpieces 170 when inverted and into which the workpieces 170 are loaded after inversion. In the example illustrated, the second locations 156 are spaced apart from the first locations 154, and the unloading position is spaced apart from the loading position. Referring to FIG. 6, when in the unloading position, the end effectors 312 are in alignment with the first locations 154 for unloading the workpieces 170 therefrom. Referring to FIG. 8, when in the loading position, the end effectors 312 are in alignment with the second locations 156 for loading the workpieces 170 therein. In the example illustrated, the second locations 156 are at an elevation below the first locations 154 and spaced apart from the first locations 154 toward the station 300 when the carriers 152 are at the stop position.

In the example illustrated, each first location 154 comprises a first nest for holding the workpiece 170 prior to inversion, and each second location 156 comprises a second nest for holding the workpiece when inverted.

In some examples, the workpiece 170 can define a first product part, and the second nest can be at least partially defined by a second product part loaded into the carrier 152 at the second location 156 prior to arrival of the carrier 152 at the stop position (e.g. at an upstream processing station 160). In such examples, the first product part (workpiece 170) can be mated with the second product part during loading of the workpiece 170 back into the carrier by the end effector 312 to form a product subassembly.

In the example illustrated, the robot 310 includes a carriage 314 moveable toward and away from the carriers 152 (e.g. through operation of one or more servo-motors), and the end effectors 312 are mounted to the carriage to translate therewith for moving the end effectors 312 between the unloading, retracted, and loading positions. In the example illustrated, each end effector 312 is rotatable relative to the carriage 314 (through operation of corresponding servo-motors mounted to the carriage 314) by 180 degrees for inverting the workpieces when held by the end effector 312. In the example illustrated, after inversion, each end effector is rotatable again by 180 degrees to reset the rotational orientation of the end effector 312 (e.g. in preparation for a subsequent inversion cycle). In the example illustrated, each end effector 312 is rotatably relative to the carriage about a generally horizontal rotation axis that is generally perpendicular to the segment of the track 150 at the stop position. Each end effector 312 can include a pair of fingers moveable toward and away from each other for gripping a corresponding workpiece 170 between the fingers and releasing the workpiece 170 from between the fingers.

An example method of processing workpieces at the workpiece inversion station 300 will now be described with reference to FIGS. 5 to 10. In the example illustrated, the control systems 120, 220 are configured to electronically synchronize operation of the carriers 152 and robot 310 to carry out the methods described herein for processing the workpieces.

Referring to FIGS. 5 and 6, the end effectors 312 of the robot 310 are advanced to the unloading position in electronic synchronization with advancement of the carriers 152 (along the track 150) to the stop position to synchronize arrival of the carriers 152 at the stop position with arrival of the end effectors 312 at the unloading position. In the example illustrated, the carriers 152 arrive at the stop position prior to arrival of the end effectors 312 at the unloading position. Referring to FIG. 6, in the example illustrated, when in the unloading position, the end effectors 312 are operated to simultaneously engage (e.g. grip) the workpieces 170 held by the carriers 152 at the stop position.

Figure 7:
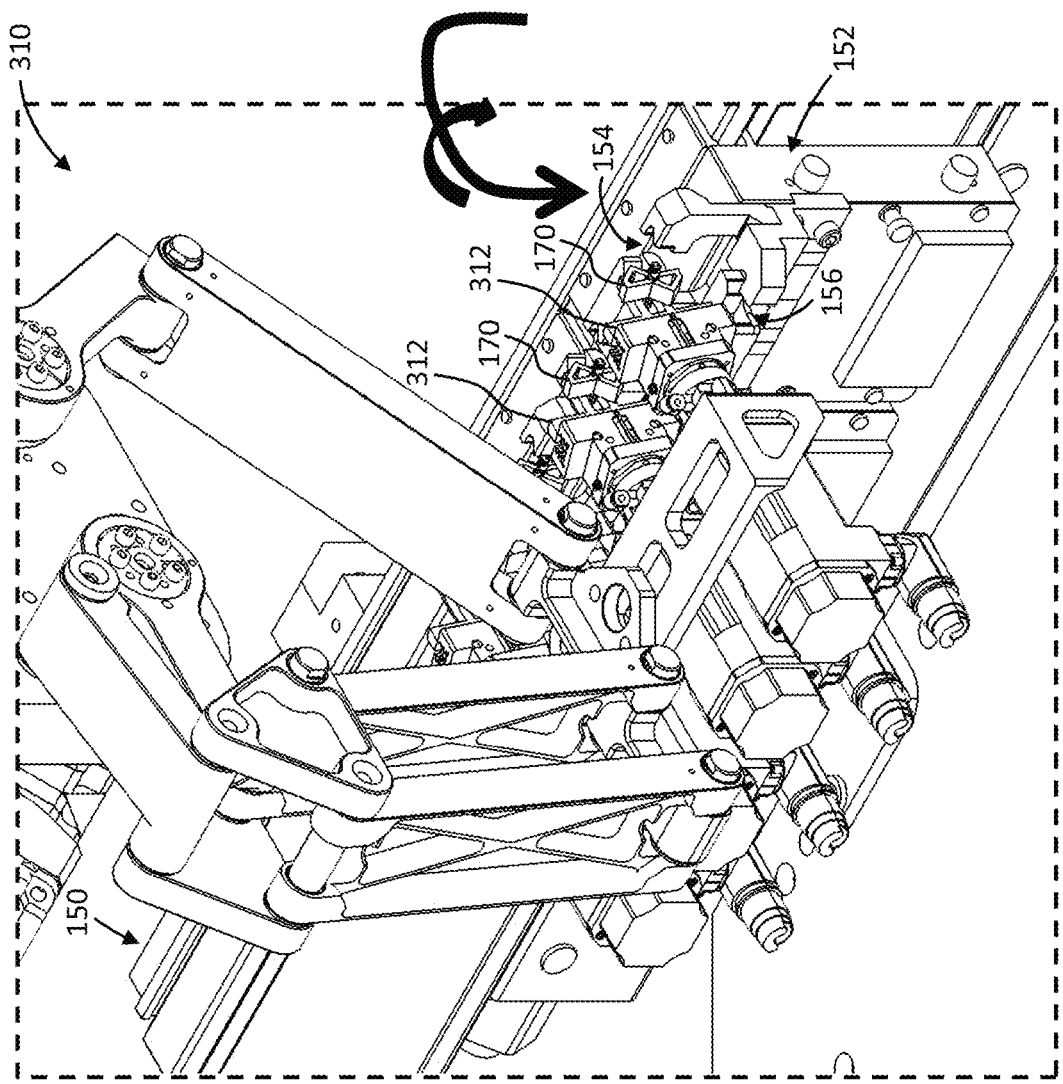

Referring to FIGS. 7 and 8, while the end effectors 312 are in engagement (e.g. gripping) corresponding workpieces, the end effectors 312 are retracted from the unloading position away from the carriers 152 to unload the workpieces 170 from the carriers 152, and then advanced back toward the carriers 152 to the loading position to load the workpieces 170 back into the carriers 152. In the example illustrated, the end effectors 312 are retracted away from the unloading position to unload the workpieces 170 from corresponding first locations 154 on the carriers 152, and advanced to the loading position to load the workpieces 170 back on the carrier at corresponding second locations 156 on the carriers 152. In the example illustrated, the end effectors 312 are rotated relative to the carriers 152 by 180 degrees to invert the workpieces 170 held by the end effectors 312 in electronic synchronization with movement of the end effectors 312 from the unloading position to the loading position to load the workpieces 170 after inversion back into the carriers 152.

In the example illustrated, rotation of the end effectors 312 for inverting the workpieces 170 is initiated during retraction of the end effectors 312 away from the unloading position (e.g. immediately after the workpieces 170 clear the carriers 152 for permitting interference free rotation), and terminates during advancement of the end effectors 312 toward the loading position (e.g. immediately prior to the workpieces 170 reaching the second nests). In the example illustrated, the movement of the end effectors 312 from the unloading position to the loading position comprises a generally continuous, uninterrupted translation of the end effectors 312. In the example illustrated, the rotation of the end effectors 312 for inverting the workpieces 170 comprises a generally continuous, uninterrupted rotation of the end effectors 312.

Figure 9:
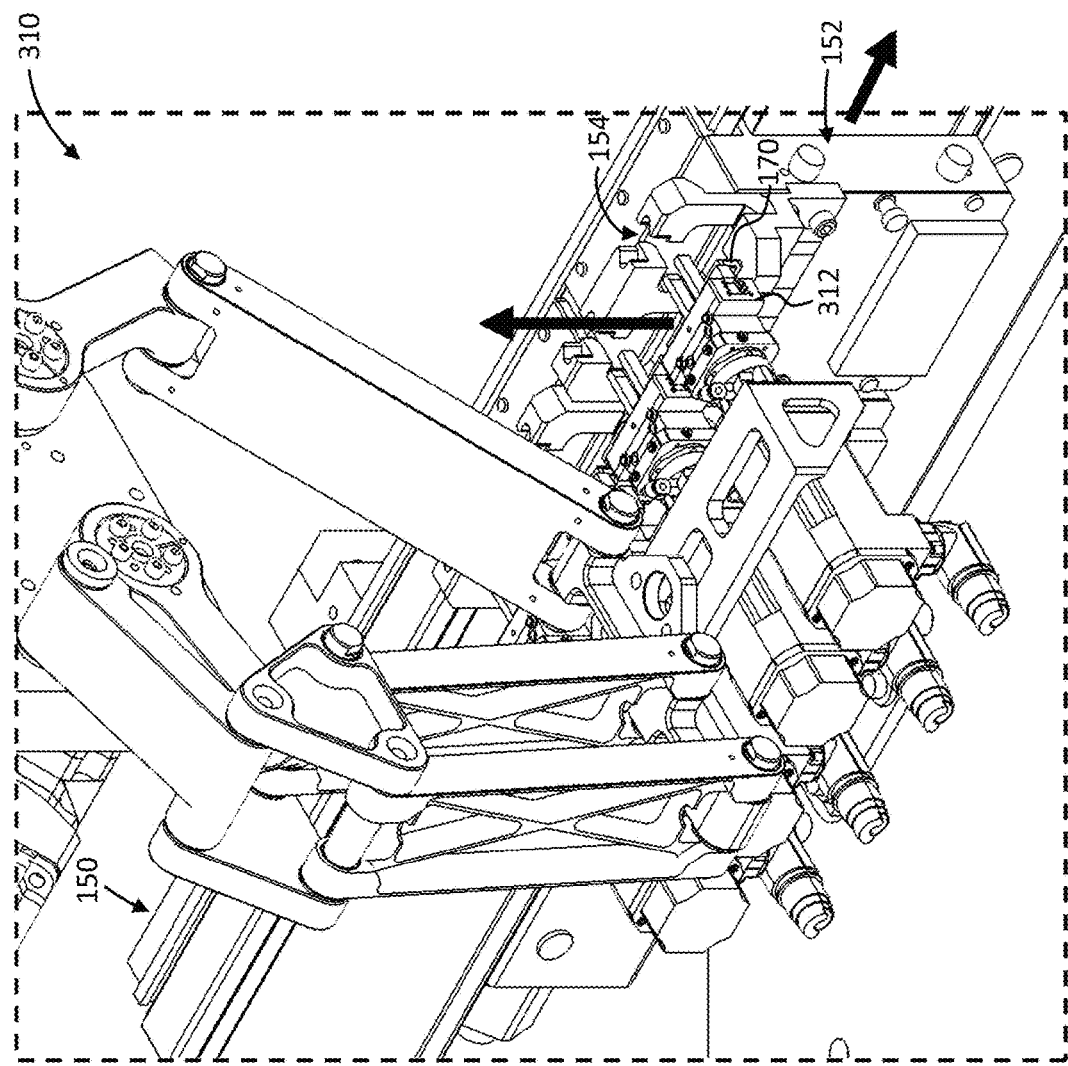
Figure 10:
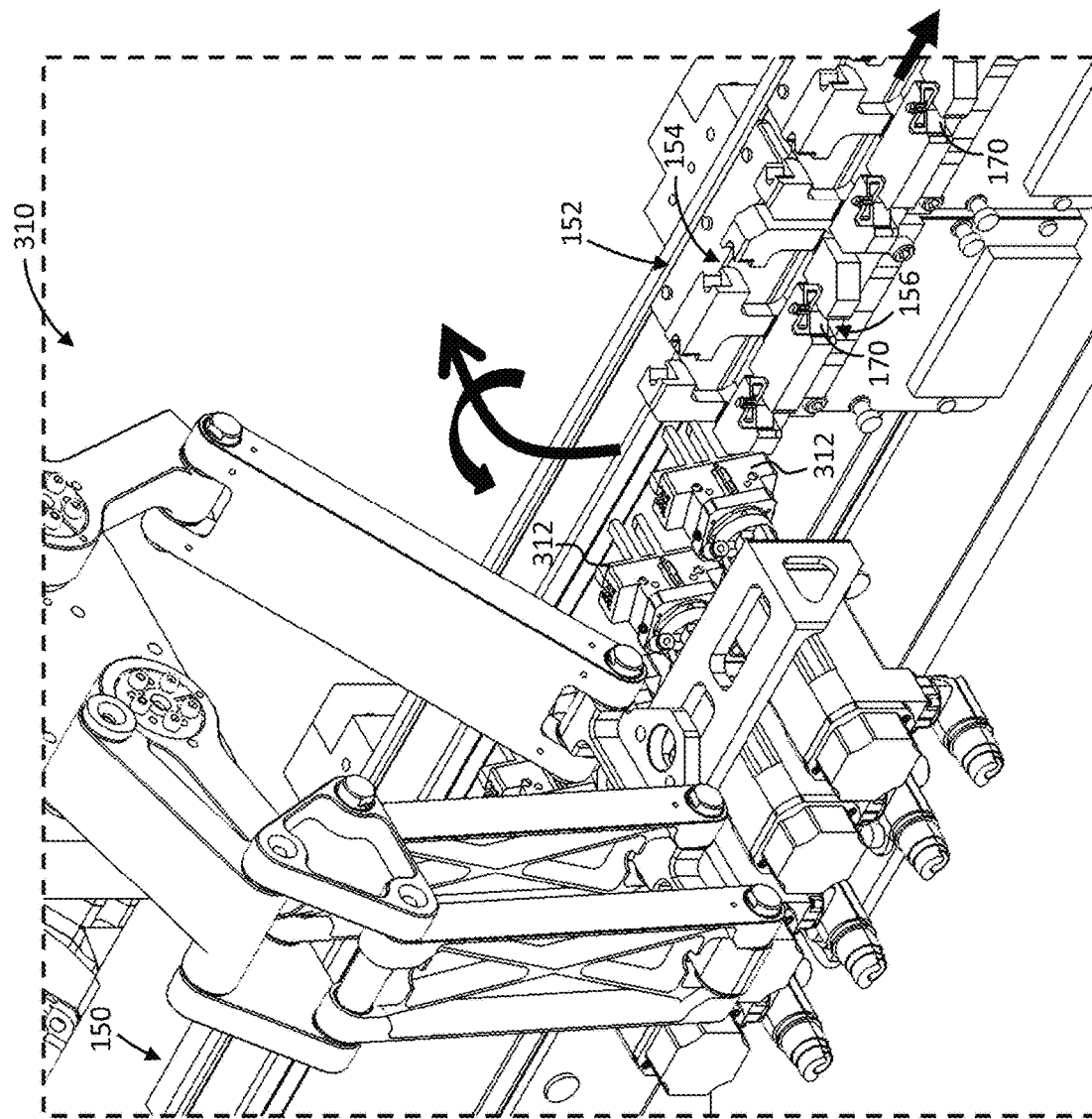

Referring to FIG. 9, in the example illustrated, after the workpieces 170 are inverted and loaded back into the carriers 152, the end effectors 312 are operated to release the workpieces 170, and the end effectors 312 are retracted away from the carriers 152 in electronic synchronization with advancement of the carriers 152 along the track 150 away from the stop position for the station 300 (and toward another stop position for another processing station 160 for further processing of the inverted workpieces 170). The end effectors 312 can then be rotated by 180 degrees to reset the rotational orientation of the end effectors 312 in preparation for another inversion cycle with another set of carriers. The inversion process is repeated continuously to invert workpieces held in subsequent carriers in a continuous mass production process.

The invention claimed is:

1. A method of inverting workpieces in an automated mass production process, comprising:
   a) advancing a carrier to a workpiece inversion station, the carrier holding at least one workpiece; and
   b) operating at least one end effector of the workpiece inversion station to unload a respective workpiece from the carrier, invert the workpiece when unloaded, and load the workpiece back into the carrier when inverted.

2. The method of claim 1, wherein during (b), the workpiece is unloaded from a first location on the carrier and loaded back on the carrier at a second location on the carrier spaced apart from the first location.

3. The method of claim 2, wherein the first location comprises a first nest for holding the workpiece prior to inversion, and the second location comprises a second nest for holding the workpiece when inverted.

4. The method of claim 2, wherein the workpiece defines a first product part, and the carrier has a second product part at the second location, the second product part loaded into the carrier prior to the carrier arriving at the workpiece inversion station, and wherein (b) includes mating the first product part with the second product part during loading of the workpiece back into the carrier.

5. The method of claim 2, wherein the second location is at a different elevation relative to the first location.

6. The method of claim 2, wherein the second location is spaced horizontally apart from the first location.

7. The method of claim 2, wherein the second location is at an elevation below the first location and spaced horizontally apart from the first location.

8. The method of claim 1, wherein inversion of the workpiece is initiated during movement of the end effector away from the carrier.

9. The method of claim 1, wherein inversion of the workpiece is completed during advancement of the end effector back toward the carrier.

10. The method of claim 1, wherein the end effector unloads, inverts, and loads the workpiece in a generally continuous, uninterrupted translation of the end effector relative to the carrier.

11. The method of claim 1, further comprising (c), after the workpiece is loaded back into the carrier, advancing the carrier away from the workpiece inversion station, and repeating (a) to (c) for each of a plurality of subsequent carriers.

12. An automated mass production system, comprising:
a) a plurality of carriers translatable through a stop position along a track, each carrier configured for holding at least one workpiece; and
b) a workpiece inversion station adjacent the stop position, the workpiece inversion station including at least one end effector, each end effector configured to unload a respective workpiece from the carrier when the carrier is at the stop position, invert the workpiece when unloaded, and load the workpiece back into the carrier when inverted.

13. The system of claim 12, wherein the carrier has a first location for holding a respective workpiece prior to unloading and a second location spaced apart from the first location and where the respective workpiece is loaded when inverted.

14. The system of claim 13, wherein the first location comprises a first nest for holding the workpiece prior to inversion, and the second location comprises a second nest for holding the workpiece when inverted.

15. The system of claim 13, wherein the workpiece defines a first product part, and the second location is configured for holding a second product part prior to the carrier arriving at the workpiece inversion station, and wherein the end effector is configured to mate the first product part with the second product part during loading of the workpiece back into the carrier.

16. The system of claim 13, wherein the second location is at a different elevation relative to the first location.

17. The system of claim 13, wherein the second location is spaced horizontally apart from the first location perpendicular to the track.

18. The system of claim 12, wherein the end effector is configured to initiate inversion of the workpiece during movement of the end effector away from the carrier.

19. The system of claim 12, wherein the end effector is configured to complete inversion of the workpiece during advancement of the end effector back toward the carrier.

20. The system of claim 12, wherein the end effector is configured to unload, invert, and load the at least one workpiece during a generally continuous, uninterrupted translation of the end effector relative to the carrier.

* * * * *